Jan. 7, 1958   E. R. WANEK   2,818,862
APPARATUS FOR FACILITATING COLONIC IRRIGATION
Filed Dec. 14, 1953
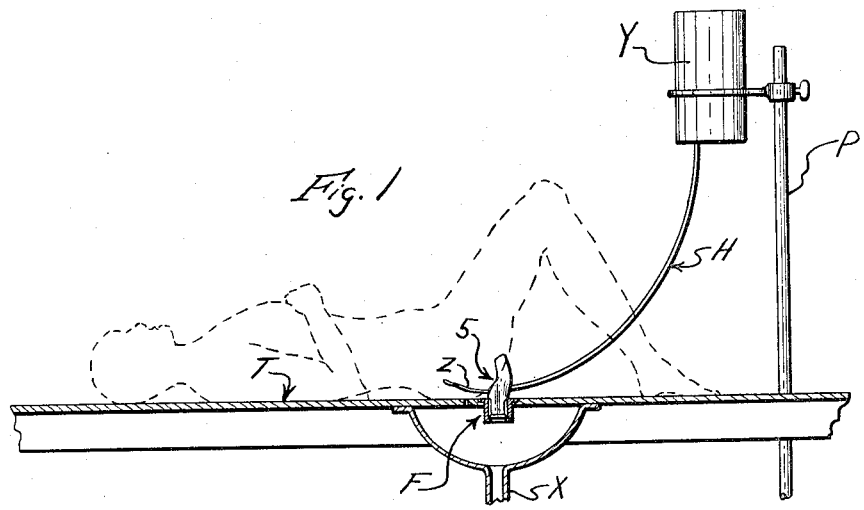
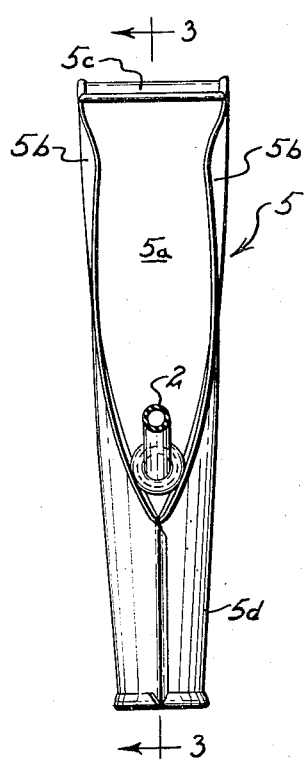
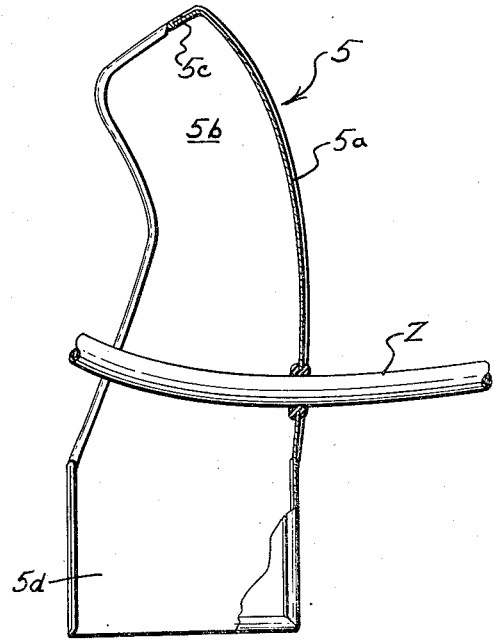
INVENTOR
EVELYN R. WANEK
BY Williamson, Williamson,
Schroeder & Adams
ATTORNEYS

United States Patent Office 2,818,862
Patented Jan. 7, 1958

2,818,862

APPARATUS FOR FACILITATING COLONIC IRRIGATION

Evelyn R. Wanek, San Francisco, Calif.

Application December 14, 1953, Serial No. 398,118

3 Claims. (Cl. 128—227)

This invention relates to colonic irrigation apparatus and more particularly, to a collector and drainage device with a flexible tube-injecting element associated therewith, for simplifying the administration of colonic irrigation.

At the present time, high colonic irrigation is generally carried out with expensive and rather complicated apparatus employing a large applicator which is inserted in the rectum and through which the adjustable and flexible irrigation tube is positioned. The applicator has usually, a connection to a source of partial vacuum and communicates with a drain tube. The use of applicators is often harmful to a hemorrhoid condition and suction applied thereto in some cases, is injurious to the colon, causing in some instances, ulcerated conditions.

It is an object of my present invention to provide a very simple but highly efficient apparatus for giving high colonic irrigation which eliminates the use of applicators and suction-withdrawal means and whereby a high colonic treatment may be readily administered and the fecal matter eliminated during irrigation in the natural way, giving proper exercise to the colon and upper intestines.

Another object is the provision of a simple, inexpensive, colonic irrigation apparatus, including a small collector and material-deflecting device positioned and contoured to closely fit between the legs of the patient and at the crotch and surrounding the anus, and operative to continuously receive, deflect and drain to sewerage, all liquids and fecal matter expelled during the colonic treatment.

A still further object is the provision of complete apparatus for the purposes described, utilizing a minimum number of parts, facilitating sterilizing of the entire apparatus and effective to perform highly efficient service.

These and other object and advantages of my invention will more fully appear from the following description made in connection with the accompanying drawings, wherein like reference characters refer to similar parts throughout the several views and in which:

Fig. 1 is a vertical section taken longitudinally through a reclining colonic treatment table, showing my apparatus in side elevation, removably mounted in operative position therein;

Fig. 2 is a front elevation of the collector and drainage device detached, showing a flexible injecting-tube associated operatively therewith; and Fig. 3 is a vertical section taken along the line 3—3 of Fig. 2.

In the form of the invention illustrated, my apparatus is utilized with a reclining treatment table T of conventional type having a sump drainage portion underlying the same which in turn is connected with the sewage conduit by a pipe X.

A liquid-containing tank Y of conventional structure is adjustably mounted upon pedestal P and has a discharge neck communicating with an elongated, flexible hose H of relatively small diameter. The hose H as shown, is removably connected with a highly flexible, water-injecting tube Z for insertion upwardly into the rectum and colon, said tube Z terminating in a somewhat restricted jet or opening.

My improved apparatus includes in combination with the small flexible water-injecting tube, a collector and deflecting device indicated as an entirety by the numeral 5 which may be constructed from suitable material such as plastic, stainless steel or the like and detachably fits and is mounted in an upstanding position upon a generally oval shaped fitting F attached to the central portion of the reclining treatment table T and extending therethrough, having as shown, an inturned abutment flange for engaging the bottom edge of my device 5. The collector device 5 has a segment shaped rear wall 5a which is curved downwardly and acts as a deflector for expelled liquids and fecal matter. Said device has a pair of side walls 5b integrally formed or connected in sealed relation with the rear wall 5a and being joined together at the lower portion of the structure to form a short conduit section 5d of generally oval cross sectional shape. The upper portions of the side walls 5b converge from the upper end of collector device 5 and are shaped as shown in Figs. 1 and 3, to conform closely to the crotch portion of a patient lying down on the treatment table, closely fitting the legs and crotch portion and surrounding the anus.

At the upper end of collector device 5, a deflector or partial closure 5c is transversely connected between the upper edges of the side walls 5b and to the top edge of the back wall 5a, serving to prevent any upward deflection of liquids.

In utilizing my apparatus the patient reclines upon a table or couch of the type illustrated in Fig. 1 with the legs in slightly raised position as indicated in the drawings. The collector device 5 is then supported as illustrated in an upright position in fitting F and the water-injecting tube Z is properly adjusted and frictionally fits the small aperture in the lower portion of the rear wall 5a of the device. I prefer to use a somewhat restricted flexible tube having an internal diameter of approximately one eighth of an inch.

The treatment may be self-administered conveniently with my improved apparatus, the user inserting the tube to the desired distance within the rectum and thereafter, may position himself with the forward edges of the side walls 5b of the collector device pressed closely against portions of the buttocks at the sides of the anal declivity and crotch and surrounding and extending for some distance below the anus. The flow of water may then be released and a low or high enema given with the water continuously flowing, irrigating and flushing the colon. Fecal material and fluids expelled are all first directed against the curved, rear wall 5a of the device which with the cooperation of the side walls, directs such material downwardly through the lower tubular portion of collector device 5 and thence to the drainage sump of table T connected with the sewerage.

The forward edges of the side walls 5b are preferably rounded or beaded to comfortably and tightly engage the skin and flesh of the user.

In administering a treatment to a female patient the patient may conveniently urinate during the continuing treatment, the collector 5 efficiently serving to catch and drain the urine.

From the foregoing description, it will be seen that I have provided a very simple, inexpensive but highly efficient apparatus for self-administering colonic irrigation treatment and which eliminates the use of applicators and suction-withdrawal means while providing for continuing collection and drainage of materials expelled from such irrigations.

The collector 5 in general, it will be noted, constitutes a shell open at its forward portion and shaped for close conformance to the essential parts of the human body in colonic treatments. The shell includes a short conduit portion at the lower end adapted for connection with drainage facilities and in the form shown, also provides a convenient means of mounting the device for operation.

It will of course be understood that various changes may be made in the form, details, arrangement and proportions of the parts without departing from the scope of my invention.

What I claim is:

1. Colonic irrigation apparatus comprising an upwardly extending collector, drainage and injecting-tube-supporting device in the form of an integral rigid shell, said shell having an upstanding rear deflecting wall curved forwardly and then downwardly at its upper portion for positioning oppositely to the lower buttocks portion of a prostrate person, said shell having an elongated open forward portion defined by a pair of spaced, side wall elements extending forwardly from said rear wall and contoured on concave curvatures at their forward edges and spaced apart and shaped with said curvatures to contact the crotch and the inner sides of the buttocks cheeks and anal declivity to surround the anus, said forward edges at their lower portions converging to form a closed end for said opening disposed at a point a short distance above the lower end of said shell, the lower portion of said shell below said opening being tubular and of elliptical cross sectional shape for communication with drainage facilities and having in the rear portion thereof, sealed means for accommodating and supporting a flexible, forwardly extended irrigation tube.

2. The structure set forth in claim 1 further characterized by the elliptical shape and dimensions of the lower tube portion of said shell being such as to contact and seal against the crotch portions and anal declivity at areas rearwardly and upwardly of the anus of a human being.

3. The structure set forth in claim 1 further characterized by the upper portions of said side wall elements being converged inwardly short of their upper ends to produce concave surfaces for snugly interfitting the sides of the crotch portions of a human being when lying in prostrate form.

References Cited in the file of this patent
UNITED STATES PATENTS

| | | |
|---|---|---|
| 935,227 | Pfeifer et al. | Sept. 28, 1909 |
| 2,043,005 | Mayberry | June 2, 1936 |
| 2,133,626 | Mayberry | Oct. 18, 1938 |

FOREIGN PATENTS

| | | |
|---|---|---|
| 422,966 | Great Britain | Jan. 23, 1935 |